(12) United States Patent
LeBlanc et al.

(10) Patent No.: US 8,442,845 B2
(45) Date of Patent: *May 14, 2013

(54) SYSTEMS AND METHODS FOR DETERMINING COST OF INSURANCE RATES

(75) Inventors: Dawn M. LeBlanc, Farmington, CT (US); David P. Wiland, South Windsor, CT (US); Shawn M. Denman, Torrington, CT (US); Michael J. Roscoe, South Windsor, CT (US)

(73) Assignee: The Prudential Insurance Company of America, Newark, NJ (US)

( * ) Notice: Subject to any disclaimer, the term of this patent is extended or adjusted under 35 U.S.C. 154(b) by 108 days.

This patent is subject to a terminal disclaimer.

(21) Appl. No.: 13/100,519

(22) Filed: May 4, 2011

(65) Prior Publication Data

US 2011/0208549 A1   Aug. 25, 2011

Related U.S. Application Data

(63) Continuation of application No. 12/142,295, filed on Jun. 19, 2008, now Pat. No. 7,962,351.

(51) Int. Cl.
*G06Q 40/00* (2012.01)
(52) U.S. Cl.
USPC .......................................................... 705/4
(58) Field of Classification Search ................... None
See application file for complete search history.

(56) References Cited

U.S. PATENT DOCUMENTS

| | | | |
|---|---|---|---|
| 6,041,304 A | 3/2000 | Meyer et al. | |
| 6,456,979 B1 * | 9/2002 | Flagg | 705/4 |
| 7,089,191 B2 | 8/2006 | Baron et al. | |
| 7,698,158 B1 * | 4/2010 | Flagg | 705/4 |
| 7,962,351 B2 * | 6/2011 | LeBlanc et al. | 705/4 |
| 2002/0040307 A1 | 4/2002 | Roscoe et al. | |
| 2003/0110061 A1 | 6/2003 | Lakenbach et al. | |
| 2005/0086085 A1 | 4/2005 | Berlin et al. | |
| 2009/0037231 A1 * | 2/2009 | Menke | 705/4 |
| 2009/0319302 A1 | 12/2009 | LeBlanc et al. | |

OTHER PUBLICATIONS

Kenneth Black, Jr and Harold D. Skipper, Jr., Life and Health Insurance, thirteenth Edition, 2000 pp. 279-295.*
Kenneth Black, Jr. and Harold D. Skipper, Jr., "Life and Health Insurance", Thirteenth Edition, 2000, (cover 2pg. + pp. 279-295, 19 pages total).

* cited by examiner

*Primary Examiner* — Olabode Akintola
(74) *Attorney, Agent, or Firm* — Baker Botts L.L.P.

(57) ABSTRACT

According to some embodiments, a current net amount at risk associated with a life insurance policy is determined. The life insurance policy may, for example, have been previously issued to a consumer for a given face death benefit amount. At least one applicable cost of insurance rate may then be automatically selected based at least in part on the determined net amount at risk. The applicable cost of insurance rate can then be applied to the current net amount at risk for the policy. For example, a first cost of insurance rate may be applied to a first portion of the current net amount at risk, and the applicable cost of insurance rate may be applied to a second portion of the current net amount at risk.

19 Claims, 14 Drawing Sheets

SYSTEMS AND METHODS FOR DETERMINING COST OF INSURANCE RATES

CROSS-REFERENCE TO RELATED APPLICATIONS

The present application is a continuation of U.S. patent application Ser. No. 12/142,295 entitled "SYSTEMS AND METHODS FOR DETERMINING COST OF INSURANCE RATES" and filed Jun. 19, 2008 (pending). The entire contents of that application are incorporated herein by references.

BACKGROUND

Certain types of life insurance products have a cash "account value," and a consumer may have some ability to access that value and to try to increase that value. Consider, for example, a variable universal life insurance policy issued to a consumer for a given death benefit amount of $100,000. Over the life of the policy, he or she may make periodic, variable premium payments that are invested in investment options that, in turn, invest in mutual funds. In this case, the timing and amount of payments that have been made by the consumer and the performance of the investment options will, in part, determine the current cash account value associated with the policy.

The difference between the death benefit amount and the current account value of a life insurance policy is referred to as the Net Amount at Risk ("NAR"). For example, a life insurance policy with a given death benefit amount of $100,000 and a current account value of $30,000 has a $70,000 net amount at risk. That is, if the consumer dies at that point in time, an additional $70,000 needs to be paid by the insurance company in addition to the current account value in order to satisfy the death benefit amount.

To cover this risk, the insurance company applies a Cost Of Insurance ("COI") charge to the net amount at risk, typically on a monthly basis. For example, the insurance company might apply a yearly cost of insurance charge that is calculated by multiplying the current net amount at risk by a cost of insurance rate associated with the policy (e.g., 1.10 per $1,000 at risk).

A single cost of insurance rate is typically applied to the entire net amount at risk each time the cost of insurance charge is applied (although the rate applied will depend on, for example, the duration of the policy, the consumer's age, and/or whether or not he or she smokes cigarettes). Note, however, that consumers who accumulate lower current cash account values (and thus have an increased net amount at risk) may pose more of a financial risk to an insurance company as compared to consumers who accumulate higher current cash account values. Since a single cost of insurance rate is applied to the entire net amount at risk, those consumers who accumulate higher current cash account values do not benefit from this lower level of financial risk. Moreover, the insurance company's ability to motivate consumers to increase their current cash account values may be limited.

SUMMARY OF THE INVENTION

According to some embodiments, a current total net amount at risk is determined in connection with a life insurance policy previously issued to a consumer based on the current death benefit amount and cash value. At least one cost of insurance rate is then automatically selected based at least in part on the determined net amount at risk. The selected cost of insurance rate(s) may then be applied to the net amount at risk currently associated with the consumer's life insurance policy. For example, according to some embodiments, a cost of insurance charge may be periodically calculated by (i) multiplying a first portion of the current net amount at risk by a first cost of insurance rate and (ii) multiplying a second portion of the current net amount at risk by the automatically selected cost of insurance rate, wherein the automatically selected cost of insurance rate is different than the first cost of insurance rate Other embodiments include: means for determining a death benefit amount associated with an existing life insurance policy previously issued to a consumer; means for determining a current account value associated with the life insurance policy, the current account value being based at least in part on consumer payment amounts and market performance; means for calculating a current net amount at risk by subtracting the current account value from the death benefit amount; means for dynamically determining at least one cost of insurance tier based on the current net amount at risk; and means for calculating a cost of insurance amount by (i) multiplying a portion of the net amount at risk by a rate associated with the selected cost of insurance tier, and (ii) multiplying another portion by a different rate.

In some embodiments, a communication device associated with an automated insurance processing platform exchanges information with remote devices. The information may be exchanged, for example, via public and/or proprietary communication networks.

A technical effect of some embodiments of the invention is an improved and automated life insurance system and product for consumers and issuers. With this and other advantages and features that will become hereinafter apparent, a more complete understanding of the nature of the invention can be obtained by referring to the following detailed description and to the drawings appended hereto.

DETAILED DESCRIPTION

Figure 1:
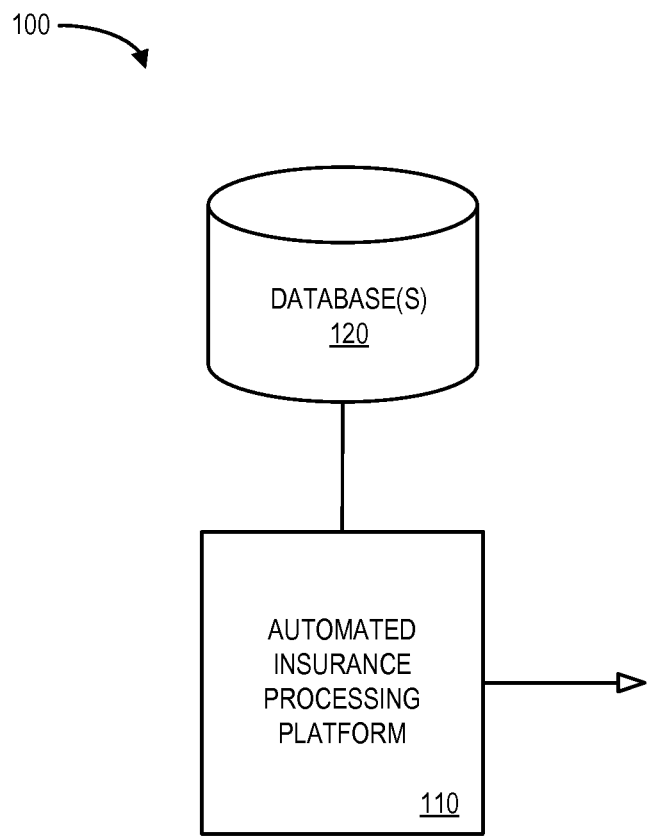
FIG. 1 is block diagram of an insurance system according to some embodiments of the present invention.

FIG. 1 is block diagram of an insurance system 100 according to some embodiments of the present invention. The system 100 may, for example, facilitate the design and/or administration of life insurance products. According to some embodiments, an "automated" insurance processing platform 110 may be provided. As used herein the term "automated" indicates that at least some part of a step associated with a process or service is performed with little or no human intervention. By way of examples only, the platform 110 may be associated and/or communicate with a Personal Computer (PC), an enterprise server, a database farm, and/or a consumer device. The automated insurance processing platform 110 may, according to some embodiments, select, determine, and/or adjust cost of insurance rates associated with life insurance policies.

The automated insurance processing platform 110 may access information in one or more databases 120. The databases 120 may include, for example, information about insurance polices that have been issued (or that are being offered) to consumers. The automated insurance processing platform 110 might access the databases 120 via a communication network. These devices (and any of the other devices described herein) could be associated with, for example, a server, a PC, a mobile or laptop computer, or any other appropriate storage and/or communication device to exchange information via a web site and/or a communication network. As used herein, devices (including those associated with the automated insurance processing platform 110, the databases 120, and any other device described herein) may exchange information via any communication network, such as a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network, and/or an Internet Protocol (IP) network such as the Internet, an intranet, or an extranet. Note that any devices described herein may communicate via one or more such communication networks.

The automated insurance processing platform 110 and/or databases 120 may, according to some embodiments, be accessible via a Graphical User Interface (GUI). The GUI might be used, for example, to dynamically display existing insurance policy information, to receive new insurance policy information, and/or to associate one or more cost of insurance rates with an existing or proposed policy.

Although a single automated insurance processing platform 110 and database 120 are shown in FIG. 1, any number of such devices may be included. Moreover, various devices described herein might be combined according to embodiments of the present invention. For example, in some embodiments, the automated insurance processing platform 110 and database 120 might be co-located and/or may comprise a single apparatus.

Figure 2:
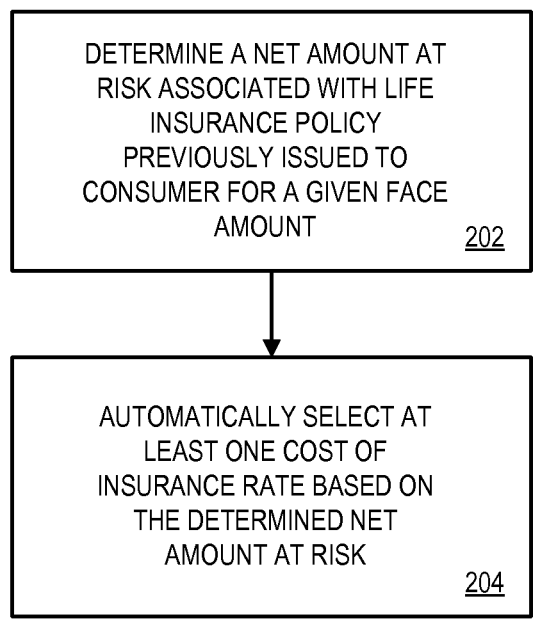
FIG. 2 illustrates a method according to some embodiments of the present invention.

FIG. 2 illustrates a method that might be performed, for example, by some or all of the elements of the system 100 described with respect to FIG. 1 according to some embodiments. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At 202, a net amount at risk currently associated with an existing life insurance policy is determined. The life insurance policy may be, for example, a variable universal life insurance policy previously issued to a consumer for a given face death benefit amount. In this case, an account value currently associated with the policy may be determined (e.g., based on his or her investments) and the difference between that account value and the given face death benefit amount may represent the new amount at risk.

Figure 3:
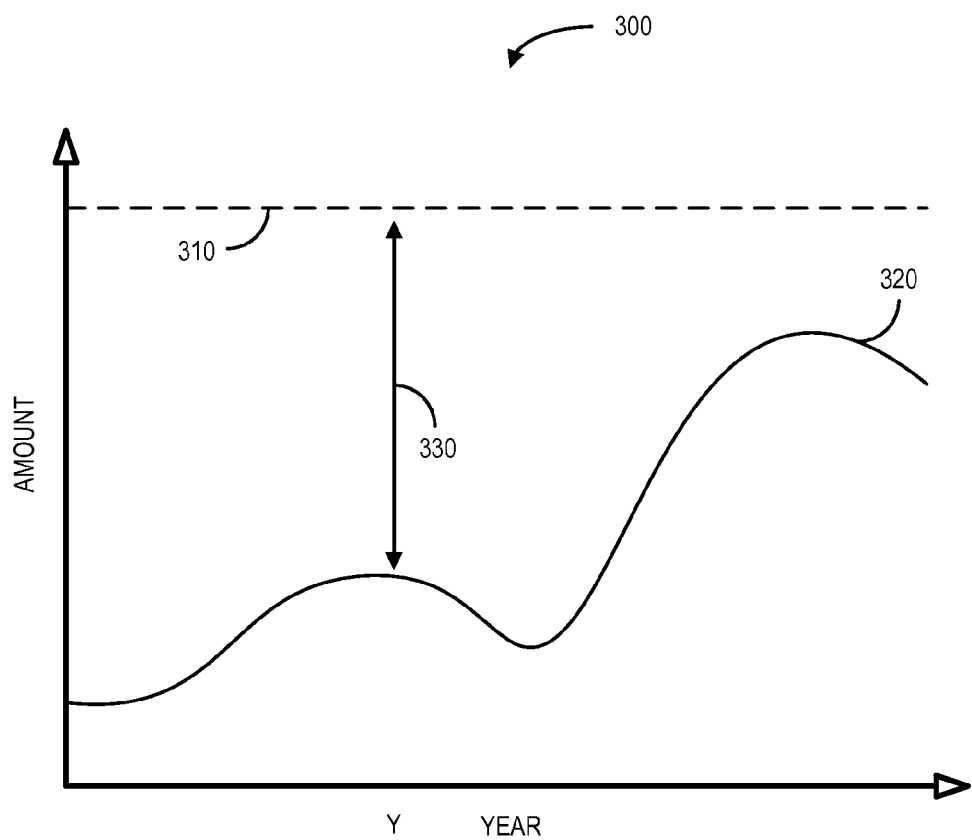
FIG. 3 is a graph illustrating insurance amounts in accordance with some embodiments of the invention.

The determination of the net amount at risk may be performed on a periodic basis. For example, the net amount at risk might be determined on a yearly basis while the policy is in effect. By way of example, FIG. 3 is a graph 300 illustrating the relationship between a given death benefit amount 310, a current account value 320, and the net amount at risk 330 for a particular year Y.

Figure 4:
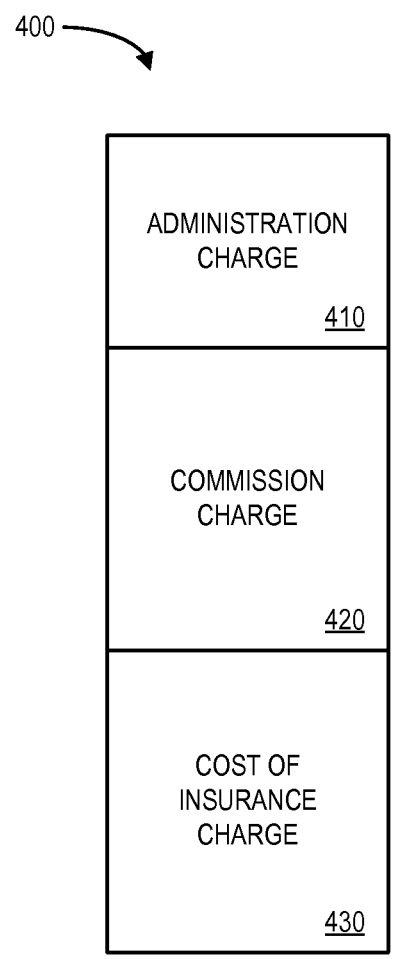
FIG. 4 illustrates some typical insurance policy charges.

The issuer of a life insurance policy may periodically apply charges based on, for example, the given death benefit amount 310, the current account value 320, and/or the net amount at risk 330 associated with the policy. For example, FIG. 4 illustrates some typical insurance policy charges 400 including an administration charge 410, a commission charge 420, and a Cost Of Insurance ("COI") charge 430.

The cost of insurance charge may be determined, in some case, by multiplying the current net amount at risk 330 for a policy by a cost of insurance rate. For example, if a policy has a net amount at risk of $50,000 and the applicable cost of insurance rate is 1.1%, then a cost of insurance charge of $550 might be applied to the insurance policy.

At 204, at least one cost of insurance rate is automatically selected to be applied to the net amount at risk currently associated with the consumer's life insurance policy. Moreover, the selection of the rate is based at least in part on the determined net amount at risk. Note that a cost of insurance rate different than the applicable cost of insurance rate may be applied to one portion of the net amount at risk (e.g., an amount below a threshold value) while the applicable cost of insurance rate is applied to a remaining portion (e.g., an amount above a threshold value). Similarly, the number of cost of insurance rates that are applied may increase as the number of insurance "tiers" are increased. According to some embodiments, an indication of one or more applicable cost of insurance rate are transmitted (e.g., to a remote agent device, the consumer, and/or a storage device).

Figure 5:
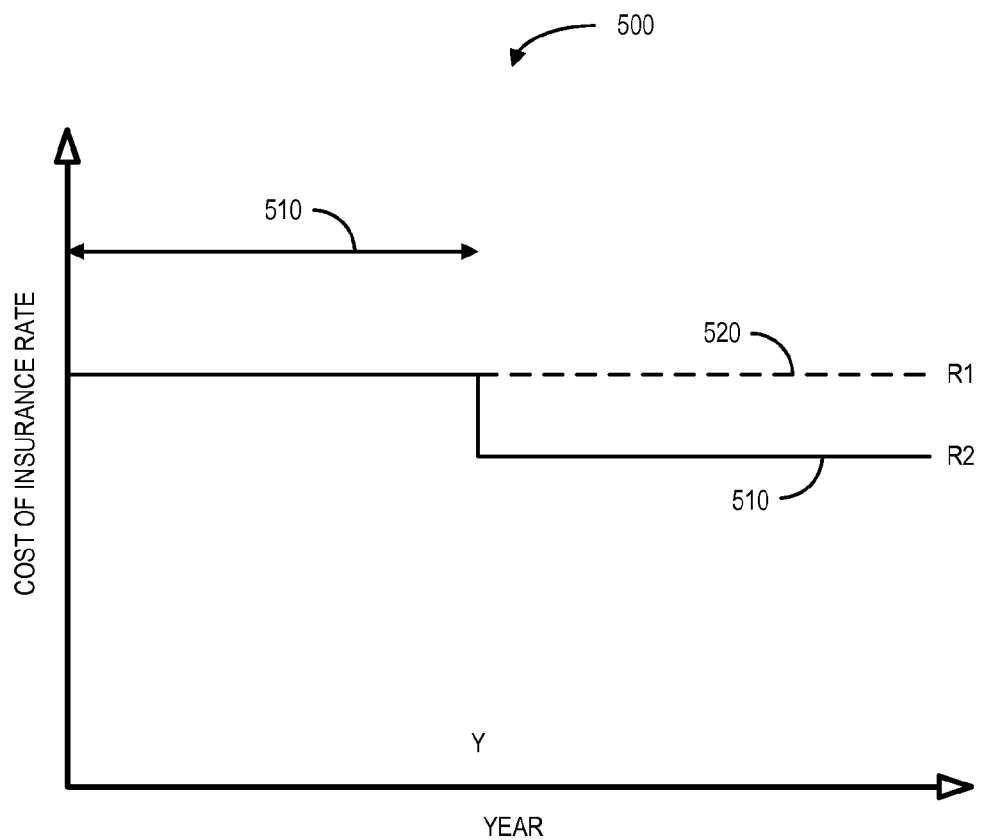
FIG. 5 is a graph illustrating some potential cost of insurance rates in accordance with some embodiments of the invention.

Consider, by way of example, FIG. 5 which is a graph 500 illustrating some potential cost of insurance rates in accordance with some embodiments of the invention. In this case, an original or initial rate R1 is used to calculate a yearly cost of insurance amount associated with life insurance policy during an initial period 510. For example, rate R1 might be used for the first ten years of a thirty year life insurance policy. According to some embodiments, there is no initial period during which a constant cost of insurance rate is applied.

After the initial period 510, it is determined if the policy meets one or more requirements to qualify for a reduced cost of insurance rate R2 (as illustrated by solid line 510). If not, the initial rate cost of insurance R1 is used (as illustrated by dashed line 520). For example, the reduced rate R2 may be used for polices that have a current net amount at risk below a pre-determined threshold value (e.g., below $50,000). That is, the cost of insurance rate (for a fixed death benefit amount)

is determined based at least in part on the net amount at risk and/or the current account value of the insurance policy.

Figure 6:
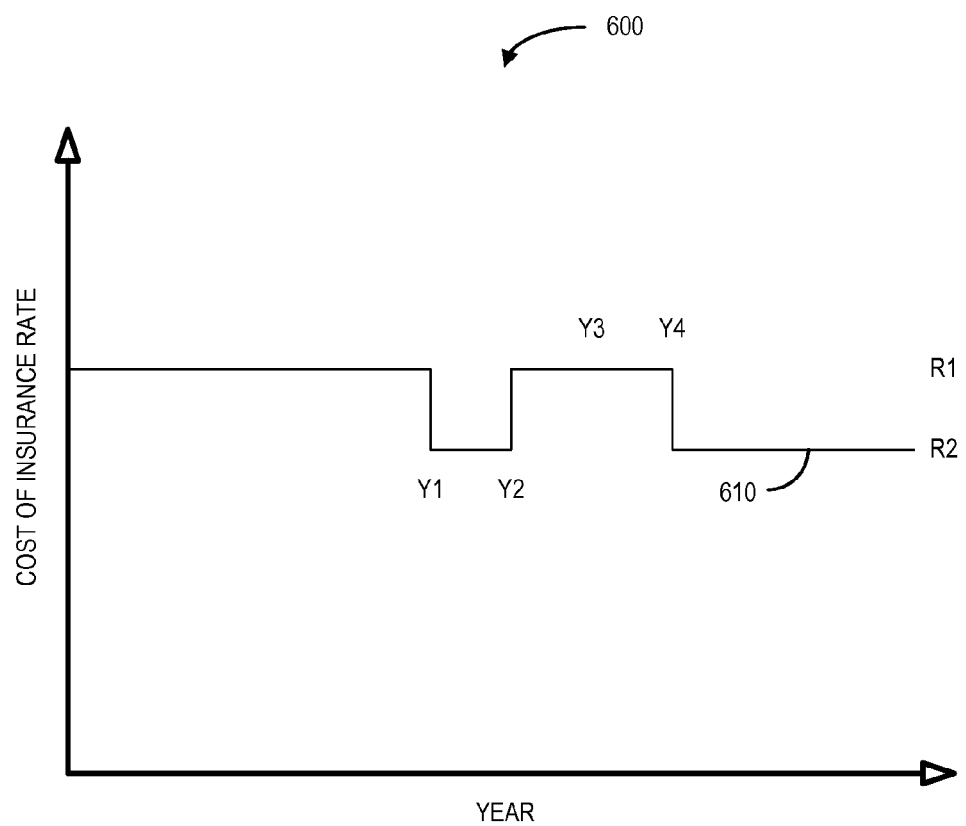
FIG. 6 is a graph illustrating applied cost of insurance rates for a given life insurance policy in accordance with some embodiments of the invention.

According to some embodiments, the determination at 204 is performed periodically, after the initial period 510, while the policy is in effect. Note that depending on the threshold values, the consumers premium payments, and the performance of his or her investments in the marketplace, a policy might qualify for the reduced cost of insurance rate in some years but fail to qualify in other years. For example, FIG. 6 is a graph 600 illustrating applied cost of insurance rates (solid line 61) for a given life insurance policy in accordance with some embodiments of the invention. In this case, the policy qualified for the reduced cost of insurance rate R2 in years Y1 and Y4 but not in years Y2 or Y3.

By selecting a cost of insurance rate based on the net amount at risk and/or the current account value of the policy, consumers who accumulate higher current cash account values may benefit from the lower risk they pose to the insurance company (e.g., because they are able to take advantage of the reduced rate R2). Moreover, the approach may help an insurance company motivate consumers to increase their current cash account values (and thus reduce the net amount at risk) by increasing premium payments and/or by improving the performance of their investments.

Figure 7:
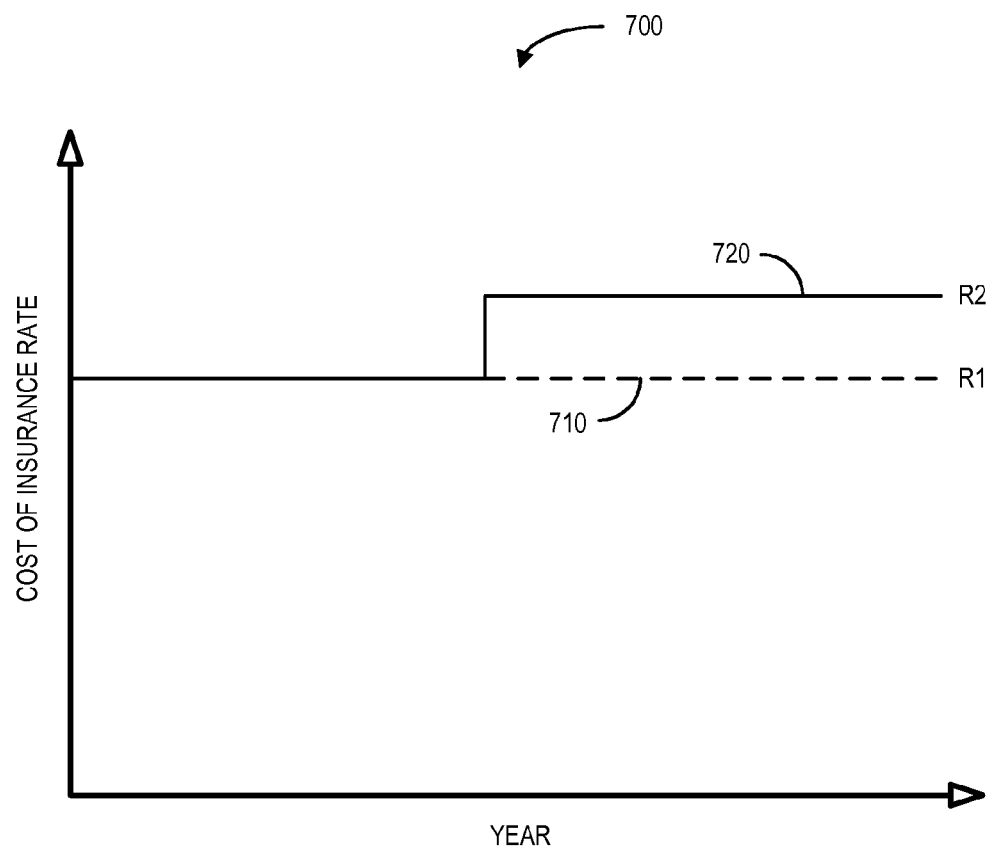
FIG. 7 is a graph illustrating cost of insurance rates in accordance with another embodiment of the invention.
Figure 8:
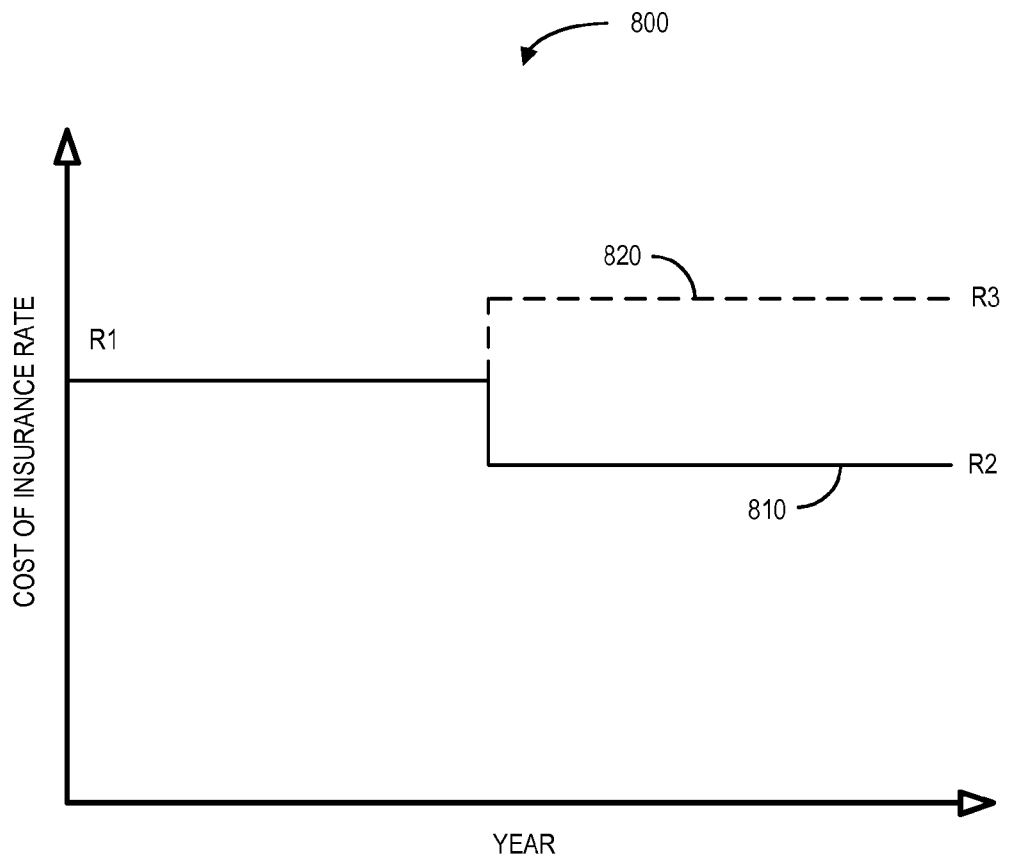
FIG. 8 is a graph illustrating cost of insurance rates in accordance with still another embodiment of the invention.

The structures shown in FIGS. 5 and 6 are for illustration only, and any number of other arrangements might be provided. For example, FIG. 7 is a graph 700 illustrating cost of insurance rates in accordance with another embodiment of the invention. In this case, it is determined after an initial period whether an original cost of insurance rate R1 will be continued (as illustrated by dashed line 710) or whether an increased cost of insurance rate will be applied (as illustrated by sold line 720). As yet another example, FIG. 8 is a graph 800 illustrating how an initial cost of insurance rate R1 may be adjusted either down (to rate R2 as illustrated by the solid line 810) or up (to rate R3 as illustrated by the dashed line 820) depending on the net amount at risk associated with the policy.

Figure 9:
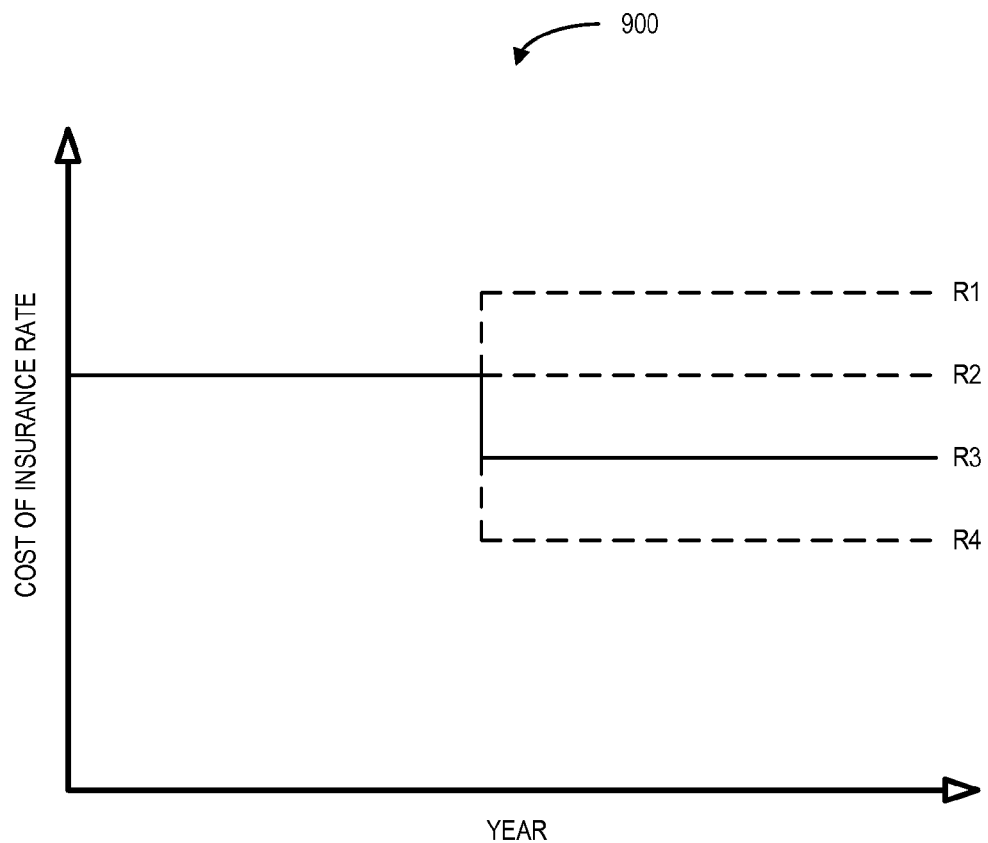
FIG. 9 is a graph illustrating multiple cost of insurance rate tiers in accordance with some embodiments of the invention.

According to some embodiments, the determination of a cost of insurance rate performed at 204 comprises selecting an applicable cost of insurance rate from a pair of potential cost of insurance rates (e.g., a first tier may be applied when the net amount at risk is less than a threshold amount while a second tier is applied when the net amount at risk is greater than the threshold amount). Note, however, that any number of potential rates may be employed in accordance with embodiments of the present invention. For example, FIG. 9 is a graph 900 illustrating four cost of insurance rate tiers (e.g., associated with rates R1 through R4) in accordance with some embodiments of the invention. Also note that various tiers might be equal to, greater than, or less than an original cost of insurance rate associated with the life insurance policy. Moreover, more than one threshold amount might be used to select the appropriate tier.

Figure 10:
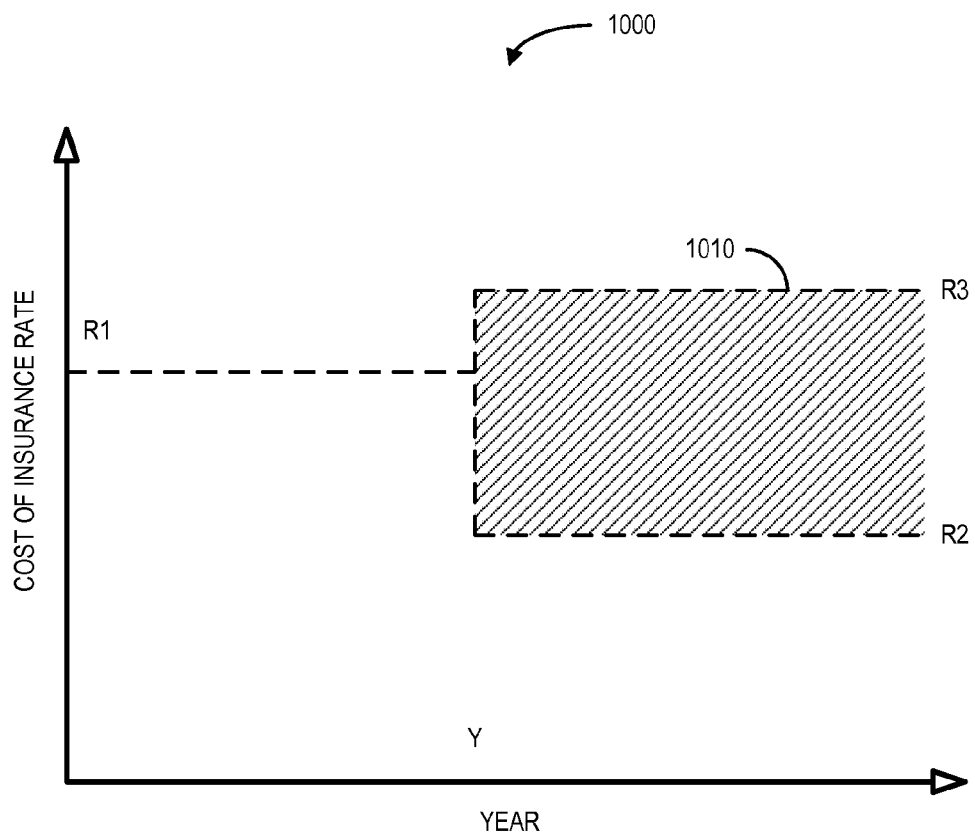
FIG. 10 is a graph illustrating potential cost of insurance rates in accordance with some embodiments of the invention.

According to some embodiments, a formula or rule might be used to dynamically calculate a cost of insurance based on the net amount at risk. That is, there might not be a discrete set of pre-determined rates (from which one is selected). According to some embodiments, a maximum and/or minimum cost of insurance rate may be provided. FIG. 10 is a graph 1000 illustrating an area 1010 representing possible cost of insurance rates in accordance with some embodiments of the invention. In this case, the cost of insurance rate might be calculated using a formula (having the current net amount at risk as an input) such that the rate will be between R2 and R3.

Figure 11:
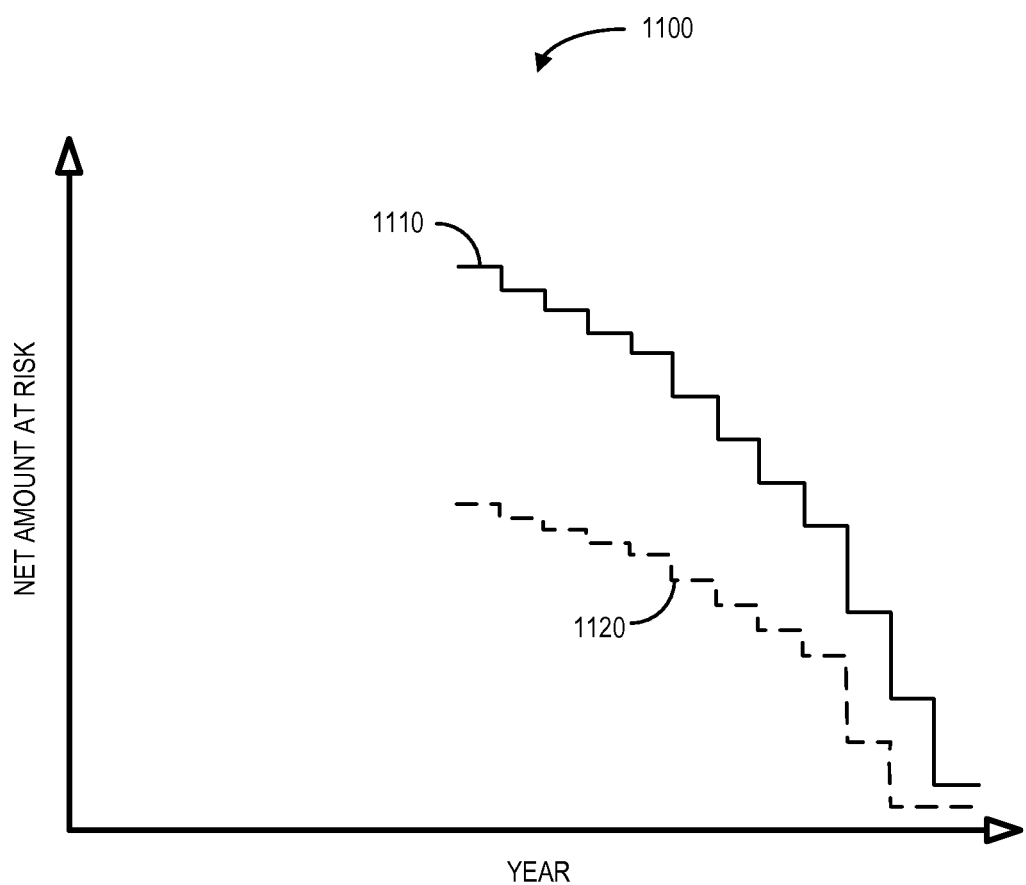
FIG. 11 is a graph illustrating threshold amounts in accordance with some embodiments of the invention.

According to some embodiments, selecting the applicable cost of insurance rate includes selecting a rate associated with a first tier when the current net amount at risk exceeds a threshold amount. For example, the first tier might be applicable when the net amount at risk exceeds $50,000. Note that selections may be performed on a periodic basis (e.g., yearly) and that selections for different periods could be associated with different threshold amounts. By way of example, FIG. 11 is a graph 1100 illustrating threshold amounts 1110 in accordance with some embodiments of the invention. In this case, the net amount at risk amount that would result in an alternate cost of insurance rate being selected decreases over the life of the policy (after an initial period). One or more additional sets of threshold amounts 1120 might also be used, such as when a cost of insurance rate is selected from among a set of three potential rate tiers.

According to some embodiments, more than one cost of insurance rate is used to calculate a charge for a life insurance policy in a given year. For example, a cost of insurance charge might be calculated by (i) multiplying a first portion of the current net amount at risk by a first cost of insurance rate and (ii) multiplying a second portion of the current net amount at risk by a second cost of insurance rate, the second rate being different from the first rate.

Consider the following example, where $Tier1COI_t$ represents a cost of insurance rate at time t for a first net amount at risk tier and $Tier2COI_t$ represents a cost of insurance rate at time t for a first second amount at risk tier. Moreover, $Tier1NAR_t$ represents the total net amount at risk at time t for which the $Tier1COI_t$ rate will be applicable and $Tier2NAR_t$ represents the total net amount at risk at time t for which the $Tier2COI_t$ rate will be applicable. In addition $Tier1Ratio_t$ represents an amount by which a given death benefit amount will be multiplied in order to determine the $Tier1NAR_t$ for the policy. The following calculations may then be performed according to some embodiments:

$$NAR_t = DeathBenefit_t - CurrentAccountValue_t$$

$$Tier1NAR_t = MIN(NAR_t, Tier1Ratio_t \times DeathBenefit_t)$$

$$Tier2NAR_t = NAR_t - Tier1NAR_t$$

$$COICharge_t = (Tier1COI_t \times Tier1NAR_t) + (Tier2COI_t \times Tier2NAR_t)$$

By way of example only, consider a life insurance policy have a death benefit of $100,000 and a current account value of $20,000. In addition, the policy is designed with a first tier rate of 0.85 per $1,000 (or 0.00085 per $1) and a second tier rate of 1.10 per $1,000 (or 0.00110 per $1). As a result of the above equations, the current net amount at risk ($NAR_t$) would be $80,000. If we assume that a $Tier1Ratio_t$ of 81% is used, then $Tier1NAR_t$ will be $80,000 (representing the lesser of (i) $NAR_t$, or $80,000 and (ii) $Tier1Ratio_t$ multiplied by the death benefit amount, or $81,000). Moreover $Tier2NAR_t$ will be zero ($NAR_t - Tier1NAR_t$) and the calculated $COICharge_t$ will be (0.00085×$80,000+0.00110*$0)=$68.

Now consider the same policy with a current account value of $10,000. The current net amount at risk ($NAR_t$) would be $90,000 and $Tier1NAR_t$ will be $81,000 (representing the lesser of (i) $NAR_t$, or $90,000 and (ii) $Tier1Ratio_t$ multiplied by the death benefit amount, or $81,000). Moreover $Tier2NAR_t$ will be $9,000 ($NAR_t - Tier1NAR_t$) and the calculated $COICharge_t$ will be (0.00085×$81,000+0.00110*$9,000)=$78.75.

The particular values and structures disclosed herein are provided only as examples, and any number of other arrangements might be set forth in a predetermined contractual agreement between a consumer and an insurer at the time a life insurance policy is issued. Note that according to some embodiments, the determined cost of insurance rate is used to automatically calculate a charge to be applied to the consumer's policy. Moreover, a determined cost of insurance rate might be disclosed and/or displayed to a consumer (e.g., an applied rate might be included in a billing statement or a predicted rate might be provided in connection an insurance product offer or example).

Figure 12:
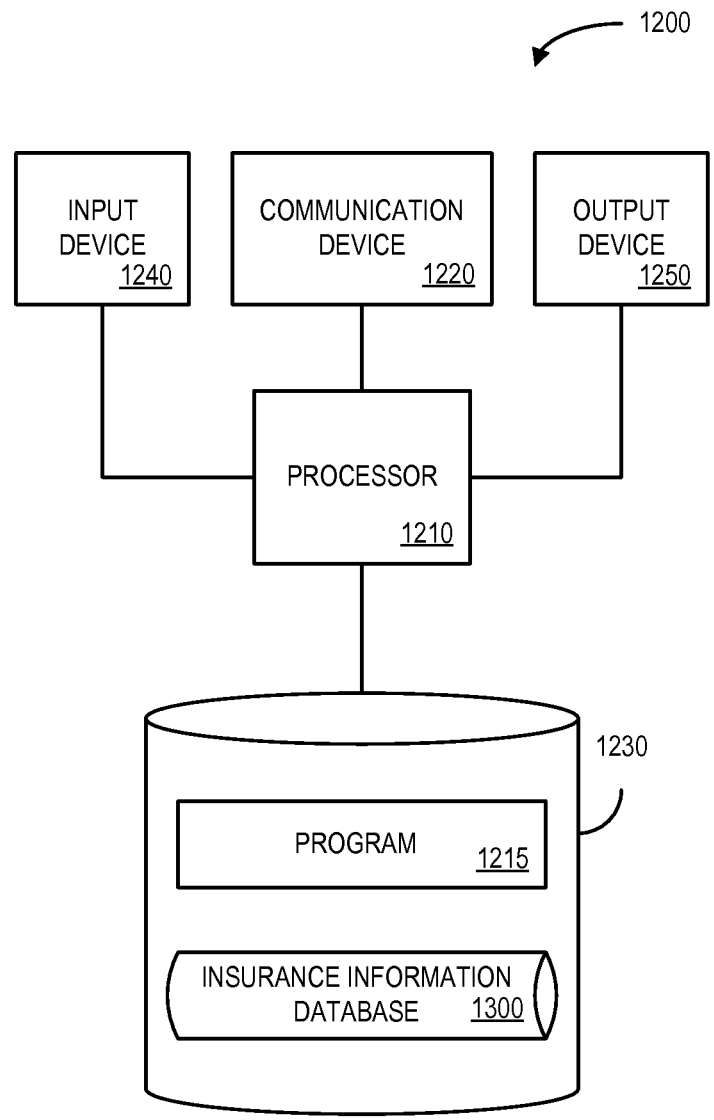
FIG. 12 is a block diagram of an insurance apparatus in accordance with some embodiments of the present invention.

FIG. 12 is a block diagram of an insurance apparatus 1200 in accordance with some embodiments of the present invention. The apparatus 1200 might, for example, comprise a platform or engine similar to the automated insurance processing platform 110 illustrated in FIG. 1. The apparatus 1200 comprises a processor 1210, such as one or more INTEL® Pentium® processors, coupled to a communication device 1220 configured to communicate via a communication network (not shown in FIG. 12). The communication device 1220 may be used to exchange insurance policy information, for example, with one or more remote devices.

The processor 1210 is also in communication with an input device 1240. The input device 1240 may comprise, for example, a keyboard, a mouse, or computer media reader. Such an input device 1240 may be used, for example, to enter information about existing or proposed life insurance polices and associated cost of insurance rate tiers. The processor 1210 is also in communication with an output device 1250. The output device 1250 may comprise, for example, a display screen or printer. Such an output device 1250 may be used, for example, to provide reports and/or display information associated with life insurance polices and associated cost of insurance rate tiers.

The processor 1210 is also in communication with a storage device 1230. The storage device 1230 may comprise any appropriate information storage device, including combinations of magnetic storage devices (e.g., hard disk drives), optical storage devices, and/or semiconductor memory devices such as Random Access Memory (RAM) devices and Read Only Memory (ROM) devices.

The storage device 1230 stores a program 1215 for controlling the processor 1210. The processor 1210 performs instructions of the program 1215, and thereby operates in accordance any embodiments of the present invention described herein. For example, the processor 1210 may determine a death benefit amount associated with an existing life insurance policy previously issued to a consumer. The processor 1210 may also determine a current account value associated with the life insurance policy, the current account value being based at least in part on consumer payment amounts and market performance. Moreover, the processor 1210 may calculate a current net amount at risk (e.g., by subtracting the current account value from the death benefit amount), and dynamically determine at least one cost of insurance tier based on the current net amount at risk. A cost of insurance amount may then be calculated by the processor 1210 by multiplying at least a portion of the net amount at risk by a rate associated with the selected cost of insurance tier. According to some embodiments, the processor 1210 calculates the appropriate cost of insurance charge by (i) multiplying a first portion of the net amount at risk by the rate associated with the selected cost of insurance tier and (ii) multiplying a second portion of the current net amount at risk by a different rate.

As used herein, information may be "received" by or "transmitted" to, for example: (i) the insurance apparatus 1200 from other devices; or (ii) a software application or module within the insurance apparatus 1200 from another software application, module, or any other source.

As shown in FIG. 12, the storage device 1230 also stores an insurance information database 1300. One example of such a database 1300 that may be used in connection with the insurance apparatus 1200 will now be described in detail with respect to FIG. 13. The illustration and accompanying descriptions of the database presented herein are exemplary, and any number of other database arrangements could be employed besides those suggested by the figures. For example, different databases associated with different types of policies or consumers might be associated with the apparatus 1300.

Figure 13:
FIG. 13 is a tabular view of a portion of an insurance information database in accordance with some embodiments of the present invention.

FIG. 13 is a tabular view of a portion of an insurance information database 1300 in accordance with some embodiments of the present invention. The table includes entries different insurance policies that have been issued to consumers. The table also defines fields 1302, 1304, 1306, 1308, 1310 for each of the entries. The fields specify: a policy identifier 1302, a face amount 1304, a current account value 1306, a current net amount at risk 1308, and a selected cost of insurance tier 1310. The information in the database 1300 may be periodically created and updated based on information associated with a consumer's life insurance policy.

The policy identifier 1302 may be, for example, an alphanumeric code associated with an existing life insurance policy that has been issued to a consumer. The face amount 1304 may represent a given death benefit amount associated with the policy. The current account value 1306 may represent the current cash value associated with that policy (e.g., based on premiums paid by the consumer and the performance of investments that he or she has made). The current net amount at risk 1308 for the policy may be determined, for example, by subtracting the current account value 1306 from the face amount 1304. Note that different types of life insurance policies may be associated with other or additional values (e.g., some types of policies may be associated with a face or base amount plus a current account value). The selected cost of insurance tier 1310 may be determined at least in part on the current net amount at risk 1308 and may be used to calculate a charge to be applied to the policy. Note that more than one cost of insurance rate may be used to calculate a cost of insurance charge. For example, a "tier 1" rate might be applied for a portion of a net amount at risk up to a threshold value while a "tier 2" rate might be applied for the remaining portion of the net amount at risk (e.g., the portion above the threshold value).

Figure 14:
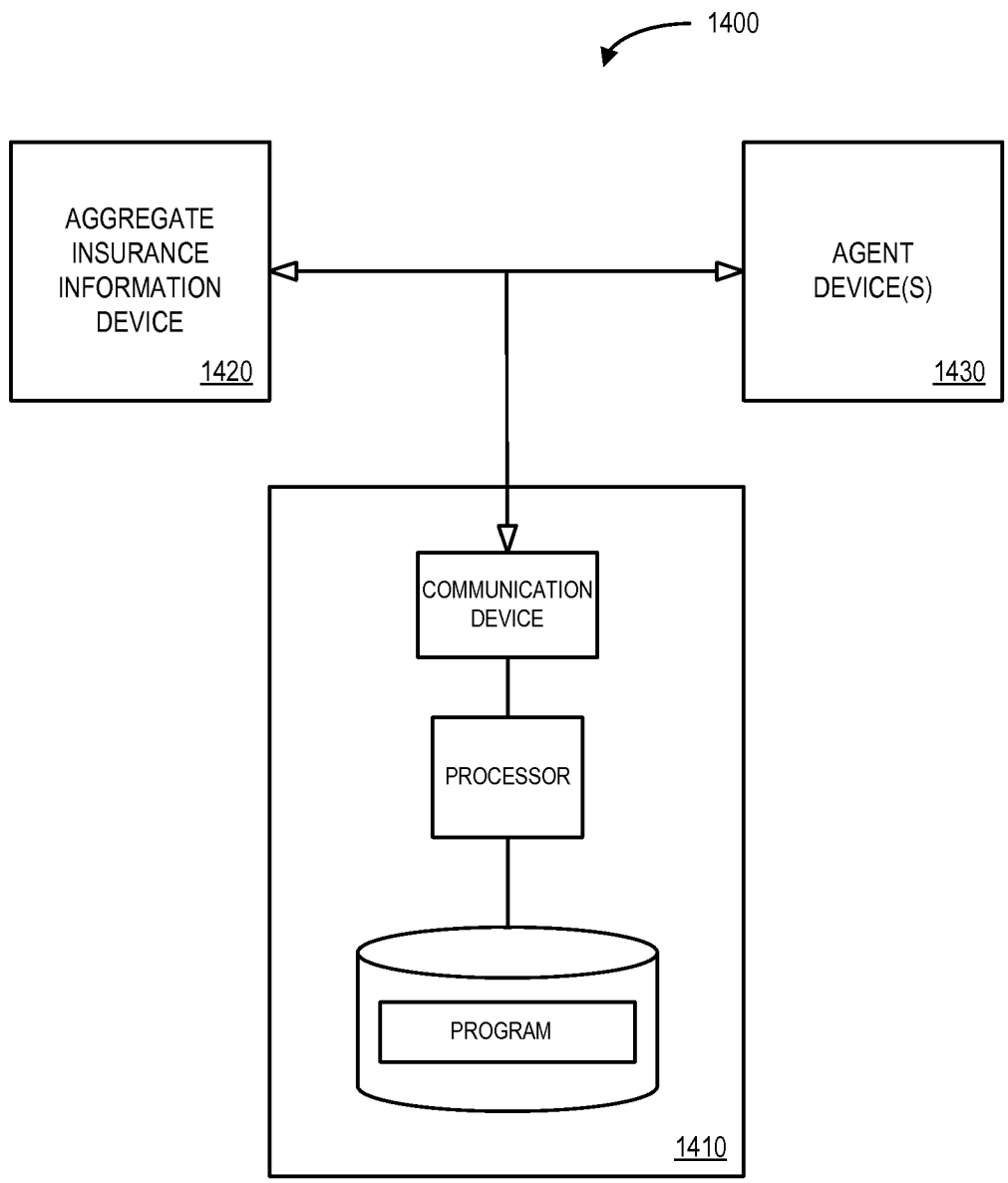
FIG. 14 is a tabular view of a system in accordance with some embodiments of the present invention.

FIG. 14 is a tabular view of a system 1400 in accordance with some embodiments of the present invention. The system 1400 includes a pricing platform 1410 that may receive data from a remote aggregate insurance information device 1420. The aggregate insurance information device 1420 may, for example, be associated with a database farm storing information about thousands of life insurance policies (e.g., including information about individual policies and/or information about groups of policies). The pricing platform 1410 may, for example, determine appropriate cost of insurance rate tiers for new life insurance policies and/or which tiers are applicable to existing life insurance polices. The pricing platform 1410 may further transmit an indication associated with one or more selected cost of insurance rates to remote agent devices 1430 and/or remote customer devices (not illustrated in FIG. 14). The pricing platform 1410, aggregate insurance information device 1420, and/or agent devices 1430 may communicate, for example, via one or more communication networks.

As a result of the embodiments described herein, consumers who accumulate higher current cash account values may benefit from the lower risk they pose to the insurance company (e.g., because they are able to take advantage of reduced rates). Moreover, the approach may help an insurance company motivate consumers to increase their current cash account values (and thus reduce the net amount at risk) by increasing premium payments and/or by improving the performance of their investments.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, not that any number of other configurations may be provided in accordance with embodiments of the present invention (e.g., some of the information associated with the databases described herein may be combined or stored in external systems). For example, data associated with a financial services enterprise (e.g., banking or trading information associated with investments made by a consumer in connection with his or her life insurance policy) might be received by an automated insurance platform and then used to automatically select an appropriate cost of insurance rate in accordance with any of the embodiments described herein. Moreover, although examples of specific types of cost of insurance tiers have been used, embodiments of the present invention could be used with other types of formulas, structures, and arrangements.

Applicants have discovered that embodiments described herein may be particularly useful in connection with variable universal life insurance products. Note, however, that other types of insurance products may also benefit from the invention.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed:

1. A computer-implemented method to facilitate administration of existing life insurance policies issued to consumers, comprising:
   determining a net amount at risk currently associated with an existing life insurance policy previously issued to a consumer for a given face death benefit amount;
   automatically selecting, by a computer, an applicable cost of insurance rate from a set of potential cost of insurance rates, to be applied to the net amount at risk currently associated with the consumer's life insurance policy, based at least in part on the determined net amount at risk;
   applying a cost of insurance rate different than the applicable cost of insurance rate to a portion of the net amount at risk currently associated with the consumer's life insurance policy;
   applying the applicable cost of insurance rate to a remaining portion of the net amount at risk currently associated with the consumer's life insurance policy; and
   transmitting an indication of the applicable cost of insurance rate.

2. The method of claim 1, wherein the life insurance policy is a variable universal life insurance policy and said determining includes evaluating an account value currently associated with the policy.

3. The method of claim 2, wherein said determining comprises:
   subtracting the account value currently associated with the policy from the given face death benefit amount.

4. The method of claim 3, wherein said determining and adjusting are performed periodically, after an initial period, while the policy is in effect.

5. The method of claim 2, wherein said applying comprises:
   calculating a cost of insurance charge by (i) multiplying a first portion of the net amount at risk by the cost of insurance rate different than the applicable cost of insurance rate to a portion and (ii) multiplying a second portion of the current net amount at risk by the applicable cost of insurance rate, the first and second portions representing the entire net amount at risk.

6. The method of claim 1, wherein said selecting the applicable cost of insurance rate includes selecting a rate associated with a first tier when the current net amount at risk exceeds a threshold amount.

7. The method of claim 6, wherein said determining and selecting are performed on a yearly basis, and selections performed in different years are based on different threshold amounts.

8. The method of claim 1, wherein the automatic selection is performed in accordance with a predetermined contractual agreement made between the consumer and the insurer at the time the life insurance policy was issued.

9. The method of claim 1, further comprising:
   automatically providing to the consumer an indication of at least one of: (i) a predicted cost of insurance rate or (ii) an applied cost of insurance rate.

10. A computer-implemented method to facilitate administration of an existing life insurance policy issued to a consumer, comprising:
    periodically determining a net amount at risk currently associated with the life insurance policy,
    automatically selecting an applicable cost of insurance rate, from a set of potential cost of insurance rates, to be periodically applied to at least a portion of the net amount at risk currently associated with the consumer's life insurance policy, based at least in part on the determined net amount at risk,
    periodically and automatically calculating, by a computer, a cost of insurance charge by (i) multiplying a first portion of the current net amount at risk by a first cost of insurance rate and (ii) multiplying a second portion of the current net amount at risk by the automatically selected applicable cost of insurance rate, wherein the automatically selected applicable cost of insurance rate is different than the first cost of insurance rate, and
    transmitting an indication associated with the applicable cost of insurance rate.

11. The method of claim 10, wherein the life insurance policy is a variable universal life insurance policy and said periodic determination includes evaluating an account value currently associated with the policy.

12. The method of claim 11, wherein said periodic determination includes subtracting the account value currently associated with the policy from the given face death benefit amount.

13. The method of claim 12, wherein the periodic determination and automatic selection are performed periodically, after an initial period, while the policy is in effect.

14. The method of claim 10, wherein the automatic selection of the applicable cost of insurance rate includes selecting a rate associated with a first tier when the current net amount at risk exceeds a threshold amount.

15. The method of claim 14, wherein the periodic determination and automatic selection are performed on a yearly basis, and selections performed in different years are based on different threshold amounts.

16. The method of claim 10, wherein the automatic selection is performed in accordance with a predetermined contractual agreement made between the consumer and the insurer at the time the life insurance policy was issued.

17. The method of claim 10, wherein the method further comprises:
storing into a database, for a plurality of consumers, life insurance face amounts, current account values, and potential cost of insurance rates along with and associated threshold amounts.

18. The method of claim 10, wherein the method further comprises:
generating for potential customers, by a life insurance information module, life insurance face amounts, exemplary future account values, and potential cost of insurance rates along with threshold amounts.

19. An apparatus to facilitate administration of existing life insurance policies, comprising:
a communication device to receive information associated with a life insurance policy previously issued for a given face amount;
a processor coupled to the communication device; and
a storage device in communication with said processor and storing instructions adapted to be executed by said processor to:
periodically determine a net amount at risk currently associated with the life insurance policy,
determine an applicable cost of insurance rate to be periodically applied to at least a portion of the net amount at risk currently associated with the life insurance policy, based at least in part on the determined net amount at risk,
periodically calculate a cost of insurance charge by (i) multiplying a first portion of the current net amount at risk by a first cost of insurance rate and (ii) multiplying a second portion of the current net amount at risk by the determined applicable cost of insurance rate, wherein the determined applicable cost of insurance rate is different than the first cost of insurance rate, and
transmit an indication associated with the life insurance policy.

* * * * *